A. N. STEVENTON & T. F. McGRATH.
Stock-Car.

No. 168,061.

2 Sheets--Sheet 1.

Patented Sept. 21, 1875.

2 Sheets--Sheet 2.

A. N. STEVENTON & T. F. McGRATH.
Stock-Car.

No. 168,061. Patented Sept. 21, 1875.

UNITED STATES PATENT OFFICE.

ALBERT N. STEVENTON AND THOMAS F. McGRATH, OF NEWARK, ASSIGNORS TO JOHN R. McPHERSON, OF JERSEY CITY, NEW JERSEY.

IMPROVEMENT IN STOCK-CARS.

Specification forming part of Letters Patent No. 168,061, dated September 21, 1875; application filed April 27, 1875.

*To all whom it may concern:*

Be it known that we, ALBERT N. STEVENTON and THOMAS F. McGRATH, both residents of the city of Newark, in the county of Essex and State of New Jersey, have invented certain new and useful Improvements in Stock-Cars; and we do hereby declare that the following is a full, clear, and exact description thereof, which will enable others skilled in the art to which it pertains to make and use the same, reference being had to the accompanying drawings, and to the letters of reference marked thereon, which form a part of this specification.

The nature and object of this invention are to facilitate the transportation of live stock in railroad-cars by such improvements in the construction and adaptation thereof for such purposes as will add greatly to the comfort and safety of the animals, and the convenience of those having them in charge during such transportation.

My invention relates to improvements in stock-cars which are provided with bins or compartments for storing food and water, and also suitable troughs connected therewith by appropriate pipes and sluices, by means of which the animals may be supplied both with food and water without the necessity of removing the stock from the cars, or losing time in waiting for them to feed during transportation, thus avoiding an immense amount of inconvenience and delay in cases where a number of days are required to perform journeys between given points, all of which will be more fully hereinafter set forth.

A distinguishing feature of our invention consists of a feed and water trough composed of separate sections, each section fitting between two wall-posts, and supported upon a continuous shaft, whereby all the troughs may be simultaneously turned into position for feeding or watering, or turned up out of the way.

Figure 1:
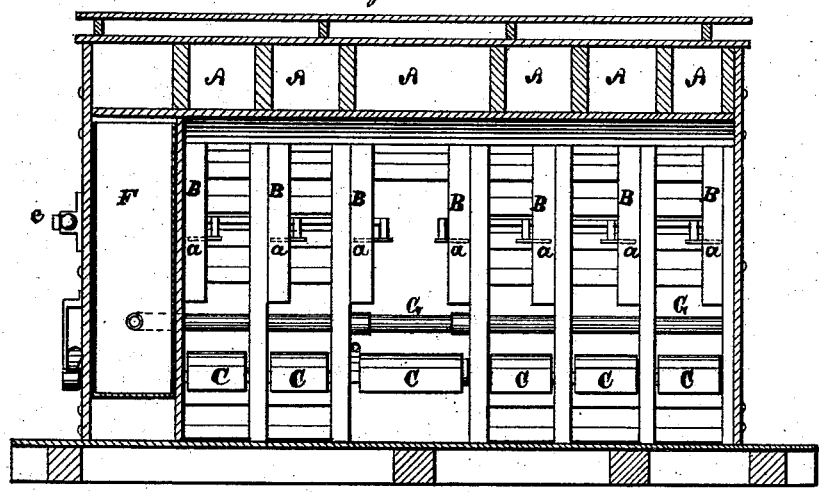
Figure 2:
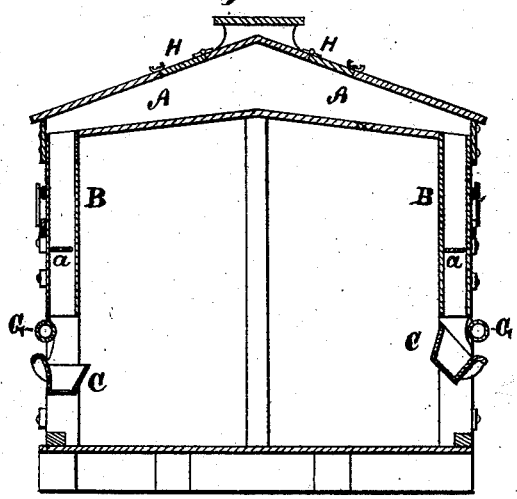
Figure 3:
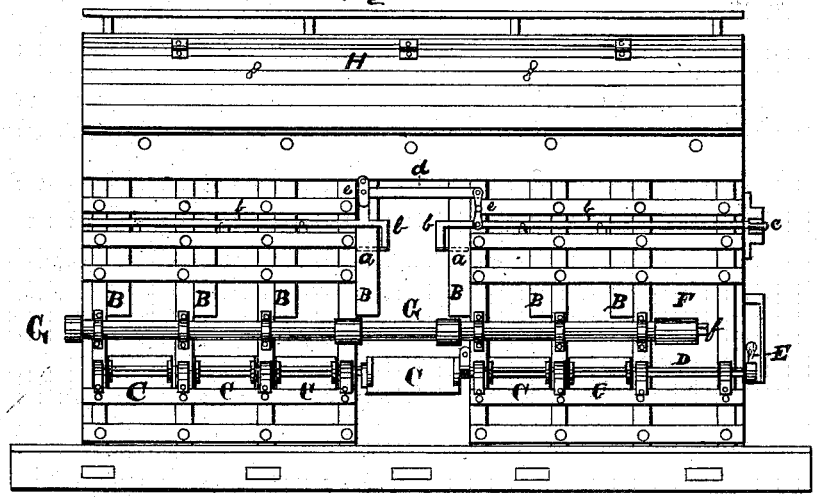
Figure 4:
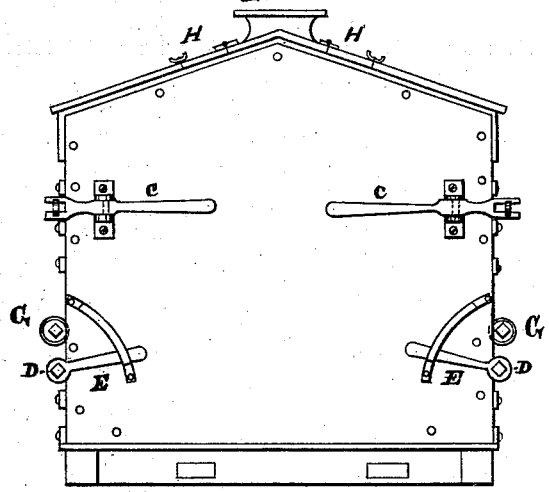

The bins A, in which to store the feed or grain, are, for convenience, constructed in the top of the car between the beams or rafters, the latter being constructed and placed in relation to each other, with a view to this end or purpose, substantially as shown and illustrated in Figures 1 and 2. Connected with each bin is a sluice, B, for the purpose of conducting the food below to the troughs C, which are placed at convenient points along the sides of the car, from which the stock may feed, substantially as shown in Figs. 1, 2, and 3. These troughs may be made stationary, or so as to fold or tilt upward and out of the way when not in use, as indicated and shown in Fig. 2. For this latter purpose the troughs are secured in sections to a shaft, D, on each side of the car, to the ends of which is attached a suitable handle or lever, E, for the purpose of operating them, as illustrated in Figs. 3 and 4. The sluices B are each provided with a sliding partition, $a$, designed to admit or shut off the flow of food from the bins to or from the troughs when desired, each of said partitions being connected to a rod or rods, $b$, and operated by suitable levers or handles $c$ at the ends of the car, or by a single handle at one end of the car, by arranging a connecting-rod, $d$, and the attachments $e$ $e$ at the doorway, so as to impart a reverse motion to the rods $b$, to which the partitions $a$ are secured, as indicated in Figs. 3 and 4. The water-tank F (see Figs. 1 and 3) is placed preferably and for convenience at the end of the car, from which the water is distributed to the several troughs by means of a pipe, G, running along the sides of the car, and provided with an outlet over each trough, the water being turned on and off, whenever desired, by means of a valve, $f$, at the ends of the pipes. A part of the roof of the car H is made to open, for the purpose of filling the bins and water-tank with food and water, as occasion may require. The troughs C, and the portions of the water-pipes G which cross the doorways, may be so arranged and coupled as to be removed when loading or unloading a car; or they may be coupled by means of hinges, so as to open out of the way, These conveniences for feeding and watering stock are adapted, and may be applied, to double as well as single decked cars. In the former case, for carrying small stock, as a matter of course, there must be two rows of troughs and two water-pipes on each side of such cars, instead of one.

In supplying both food and water, and otherwise ameliorating the condition of the dumb brute while *in transitu*, it is of the highest importance that the superficial area of the car should be kept as free from encroachments as possible in the disposition of the means for feeding and watering the stock. For this purpose we employ sectional troughs or basins, arranged to be turned down outwardly within the spaces, and between the timbers which form the walls of the car, in order that the troughs can operate as such, and project as little as possible within the car. To utilize the troughs for both feeding and watering, we have combined therewith a supply bin or bins, arranged beneath the top of the car, with tubes or sluices leading therefrom over the open walls of the car-sides, in positions to discharge the corn or other grain into the troughs, and control such distribution.

Having thus described our invention, what we claim as new, and desire to secure by Letters Patent of the United States, is—

1. In a stock-car, a feed and water trough composed of separate sections, each section fitting between two wall-posts, and supported upon a continuous shaft, whereby all the troughs may be simultaneously turned into position for feeding or watering, or turned up out of the way, substantially as described.

2. In a car for transporting live stock, the combination of the bins A, provided with the supply-openings H and sluices B, partitions $a$, operated by the rods $b$, and levers $c$, arranged to operate substantially as and for the purpose described.

3. In a car for transporting live stock, the combination of troughs C, shafts D, and levers E, substantially as and for the purposes set forth and shown.

In testimony that we claim the foregoing as our own invention we affix hereto our signatures in presence of two witnesses.

A. N. STEVENTON.
    THOMAS F. McGRATH.

Witnesses:
  OLIVER DRAKE,
  ROBERT J. ARMSTRONG.